Patented July 24, 1923.

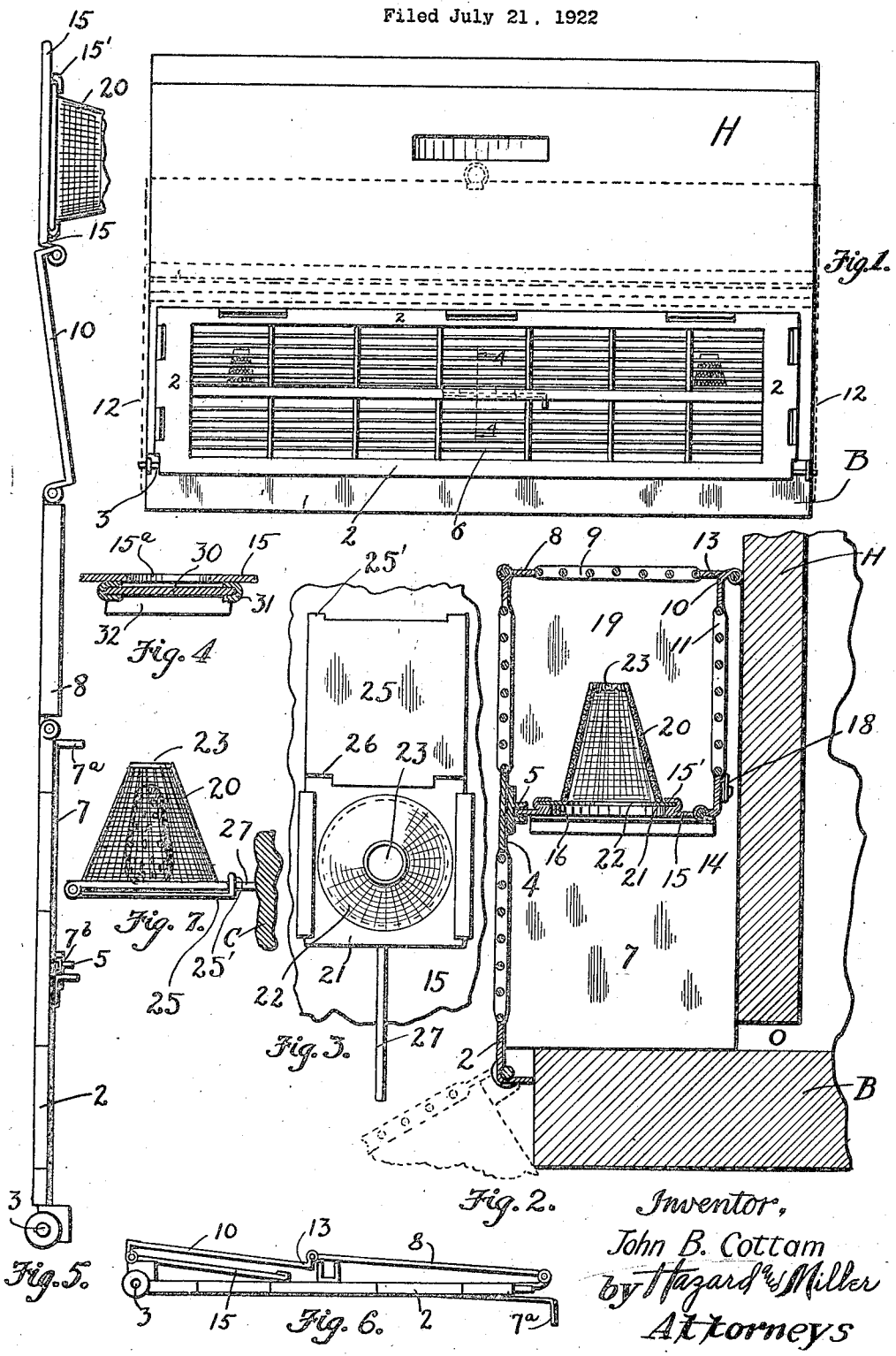

1,462,933

UNITED STATES PATENT OFFICE.

JOHN B. COTTAM, OF MONTECITO, CALIFORNIA.

COLLAPSIBLE QUEEN AND DRONE TRAP.

Application filed July 21, 1922. Serial No. 576,575.

*To all whom it may concern:*

Be it known that I, JOHN B. COTTAM, a citizen of the United States, residing at Montecito, in the county of Santa Barbara and State of California, have invented new and useful Improvements in Collapsible Queen and Drone Traps, of which the following is a specification.

This invention relates to apiarists' supplies, and more particularly to a collapsible queen and drone trap.

It is an object of the present invention to provide a simple, substantial, practicable and effective trapping device readily applicable to various forms of beehives. Another object is to provide a trap which will be effective for the catching of queen and drone bees, but will permit the ready access and egress of the honey bee to and from the hive. Another object is to provide a trap that may be compactly folded in a collapsed position for storage and transportation. Another object is to provide a trap that may be extended with its elements in a common plane so as to form a bee landing in front of a hive. Another object is to provide a queen and drone trap having removable cells which may be separately utilized from the trap to receive and to transfer and to hold a queen cell.

A further object is to provide a trap having a trapping chamber into which the drone and queen bees may find ready access, and which chamber, when applied, will permit the entrance of other bees to and from the hive without traversing the trapping chamber. Further, an object is to provide an adjustable gate leading from the trapping chamber so that the trapped queen and drones may be carried in the trap from one hive or colony to another, and the trap closure opened to permit the flight of the trapped queen and drones to another hive at entrance of which the trap may be arranged.

Various other objects and advantages of the present invention will be rendered manifest in the following specification of an embodiment of the invention, which is illustrated in the accompanying drawings, in which—

Figure 1 is a front elevation of the trap as applied to a rectangular or box-like beehive, the parts being in trapping position;

Figure 2 is a vertical section through the trap and centrally through one of the trapping cones or cells;

Figure 3 is a top plan of one of the trap cells shown as positioned over an entrance opening in the cage floor;

Figure 4 is a transverse section on line 4—4 of Figure 1 showing the escape gate in the cage floor;

Figure 5 is an end view of the fully extended sections of the trap;

Figure 6 is an end view showing the trap in compactly folded position of the parts;

Figure 7 is a side elevation of one of the trap cells detached from the trap and shown as mounted contiguous to a comb in a hive.

The trap of the present invention is adapted to be applied to different forms of beehives, one of which, of conventional type, is here shown as consisting of a box or hive H having a front wall slightly spaced above the hive bottom B so as to provide an entrance and exit opening O, Figure 2. The bottom B projects forwardly from the front of the hive and forms a shelf of sufficient dimensions to receive the trap.

The trap is built up of a number of substantial, and preferably metallic, sections, including a rigid front frame 2 of suitable dimensions, and the lower front corners of which are provided with pintles 3 which may, if desired, be attached to a form of beehive hood, such as is disclosed in my copending application filed July 21, 1922, Serial No. 576,573, and which hood embodies end panels 12 here shown in dotted lines.

The frame 2 is provided with an intermediate rail 4, and for a purpose as will be hereinafter explained, this rail is provided with longitudinal strips or ribs 5 forming a keeper. The openings of the frame 2 are provided with longitudinally extending cage bars 6, or said frame 2 is otherwise suitably constructed to provide a foraminous front panel through which the honey bees may pass readily to and from the hive, but the openings are of such dimensions as to prevent the escape of the larger drone and queen bees.

To the ends of the frame 2 are hingedly connected end panels 7 adapted to swing around to right angles as to the frame 2 and thus rest upon the forwardly projecting portion of the hive bottom B. Hingedly attached to the upper part of the frame 2 is a top frame 8, and this is provided with reticulated openings 9, the top being adapted to fold inwardly at the top of the frame 2 to the position shown in Figure 2. Hingedly connected at 10 to the inner end of the top frame 8 is an inside foraminous wall or swinging section 11, and this preferably has an angular shoulder 13 to engage the contiguous part of the top section 8 so as to limit the inward folding of the inside section 11.

Hinged along the bottom end of the inner vertical section, as at 14, is a cage bottom 15 preferably of imperforate sheet metal having openings 16 providing ingress upwardly through the horizontally arranged bottom 15 when the trap is set up and adjusted, as shown in Figure 2, over the entrance O of a hive. To facilitate the assembly or erection of the trap, the swinging edge of the bottom 15 is designed to be slipped readily into the longitudinally extending keeper 5 as above described, this latter facilitating the positioning of the parts and forming an accurate and substantial guide and support so as to insure the proper positioning of the bottom 15. The end panels 7 are provided with top flanges 7ª to overlap the top section 8 of the assembled sections of the trap to form a neat joint and serve for holding the parts in position. The end panels may be provided with keepers 7ᵇ to receive common hook latches 18 which may be pivotally mounted upon the lower portions of the inner sections 10 so that the end panels can be hooked in the position shown in Figure 7 to the inner section and the whole securely fastened.

It will thus be seen that the erected sections form a trap chamber extending substantially from end to end of the front of the hive and which will remain in a stable position when placed upon the projecting portion of the hive bottom B. The drones or queen are, therefore, confined in the trap and must pass upwardly through the openings 16 which lead into the trap chamber 19 above the trap bottom 15. To prevent the return of the trapped drones or queen, suitably constructed opening devices are employed, and these, preferably, consist of conical or otherwise suitably shaped cells 20. These cells may be of wire gauze or other suitable material, and each has its base secured on a slide plate 21 having an aperture 22 of considerable diameter so as to provide for the ready entrance, into the conical cell, of the bee. The upper end of the cell is sufficiently constricted so that, while the bee may pass outwardly, it will not readily return through the small opening 23.

Preferably each of the bee cells 20 is built up in the form of a complete unit and is adapted to be closed so as to retain an entrapped drone or queen. This is frequently necessary when it is desired to transplant a queen bee, for instance, from one colony to another, and in this case the queen, in its cell in a section of honeycomb, is bodily attached to a comb C in a queenless colony, and then a wing or bottom forming member 25, which is hinged as at 26 to one side of the cell plate 21, is closed over the bottom plate to cover the opening 22 leading thereinto to prevent the queen cell from being destroyed by bees.

The slide plate 21 is shown as provided with a pin 27 which may be utilized as a handle and also serves as a means for penetrating the face of a comb C, Figure 7, so as to support the cell with the queen inside thereof in front of the comb C.

The cells 20 are adapted to be readily applied to the trap bottom 15. The latter is provided with a series of guides 15' to receive the slide plate 21 of each cell protector. When the cell is applied, its foldable wing or bottom leaf 25 is thrown to the open position as shown in Figure 3, so that it will lie flush against the top face of the bottom 15, and the cage 20 can then be shifted so that it will register with its entrance opening 16 in the bottom 15.

After the trap has been applied for such length of time as is necessary, and the drone and queen bees have either or any of them entered the trapping chamber 19, then the trap is bodily removed from the hive and transported to another hive or otherwise disposed of as desired. When the bees have to be transferred from hive to hive, the trap is installed in its new situation and the trapped queen is permitted to escape from the trapping chamber 19 so as to enter the new hive, or be otherwise disposed of. To that end, an escape gate is provided in the bottom 15 of the trap chamber, and this gate 30 is clearly indicated in Figure 4 as comprising a flat plate, the edges of which are slidably mounted in guides 31 provided therefor in the bottom 15 and arranged alongside of an escape opening 15ª.

One end of the gate may be provided with a downturned finger piece 32 to facilitate its opening and closing. The cage having the trapped queen being applied to the new hive, the gate 30 is worked open and the entrapped queen is permitted to escape from the trap into the hive, other direction of flight being prevented by the walls of the trap.

When desired, the foldable sections of the trap may be removed and reversed into a substantially common plane as shown in Figure 5 and positioned as is indicated in dotted lines in Figure 2 in front of the bottom B so as to form a spacious, ventilated landing for the bees passing to and from the hive. Such form of foraminous landing enables the bees to obtain better traction when entering loaded with honey.

The leaf 25 may have little snap lips 25' to engage the edge of the bottom 21 of the queen cell protector. Thus the parts are all connected to form a unit, so the parts cannot be lost.

Further embodiments, modifications and changes may be resorted to within the spirit of the invention as here claimed.

What is claimed is:

1. A queen and drone trap comprising a plurality of collapsible sections adapted to be erected in cage forming position and applicable to the front of a beehive to cover the opening thereof.

2. A queen and drone trap comprising a plurality of collapsible sections adapted to be erected in cage forming position and applicable to the front of a beehive to cover the opening thereof, the sections all being hingedly connected.

3. A queen and drone trap comprising a plurality of collapsible sections adapted to be erected in cage forming position and applicable to the front of a beehive to cover the opening thereof, the sections all being hingedly connected, and adapted to be compactly folded flatwise one section upon the other.

4. A queen and drone trap comprising a plurality of collapsible sections adapted to be erected in cage forming position and applicable to the front of a beehive to cover the opening thereof, the sections all being hingedly connected, said sections being adapted to be extended in a substantially plane position to form a bee landing in front of a hive.

5. A queen and drone trap consisting of a plurality of foldably connected sections adapted to be erected and disposed in front of a beehive so as to provide for the ready ingress and egress of bees to and from the hive and to prevent the escape of drone and queen bees from the trap and hive.

6. A queen and drone trap consisting of a plurality of foldably connected sections adapted to be erected and disposed in front of a beehive so as to provide for the ready ingress and egress of bees to and from the hive and to prevent the escape of drone and queen bees from the trap and hive, the trap including a trapping chamber forming a separate compartment in which the larger bees may be entrapped.

7. A queen and drone trap consisting of a plurality of foldably connected sections adapted to be erected and disposed in front of a beehive so as to provide for the ready ingress and egress of bees to and from the hive and to prevent the escape of drone and queen bees from the trap and hive, the trap including a trapping chamber forming a separate compartment in which the larger bees may be entrapped, the trap permitting the free ingress and egress of the smaller honey bees.

8. A queen and drone trap comprising a plurality of collapsible sections adapted to be erected in cage forming position and applicable to the front of a bee-hive to cover the opening thereof, and queen holding cells in said trap.

9. A queen and drone trap comprising a plurality of collapsible sections adapted to be erected in cage forming position and applicable to the front of a beehive to cover the opening thereof, and queen holding cells in said trap, the cells being detachably mounted on a supporting member of the trap.

10. A transferring cell for apiarists' use comprising a chamber in which a queen cell may be encased and having means whereby the cell may be affixed to a honeycomb or other primary support to hold the queen bee in association therewith.

11. A collapsible bee trap comprising a front foraminous panel structure, a top section foldably connected to said structure, a back section foldably connected to the top section, and a floor section foldably connected to the back section and adapted to be folded into cooperative relation to the front structure to provide a separate trapping chamber for queen and drone bees, and end panels for the trap and being hingedly connected to associated elements thereof.

12. A collapsible bee trap comprising a front foraminous panel structure, a top section foldably connected to said structure, a back section foldably connected to the top section, and a floor section foldably connected to the back section and adapted to be folded into cooperative relation to the front structure to provide a separate trapping chamber for queen and drone bees, end panels for the trap and being hingedly connected to associated elements thereof, and means for fastening the erected elements in trap forming position.

In testimony whereof I have signed my name to this specification.

JOHN B. COTTAM.